United States Patent
Koch et al.

[15] 3,687,423
[45] Aug. 29, 1972

[54] CONTINUOUSLY OPERATING SCREW MACHINE FOR THE TREATMENT OF PLASTIC MASSES

[72] Inventors: Heinz Koch, Ludwigsburg; Eugen Martin Vöhringer, Bietigheim, both of Germany

[73] Assignee: Firma Werner & Pfleiderer, Feuerbach, Germany

[22] Filed: Dec. 19, 1969

[21] Appl. No.: 886,571

[30] Foreign Application Priority Data

Dec. 21, 1968 Germany............P 18 16 440.4

[52] U.S. Cl. .................259/109, 107/14 C, 18/12 SM
[51] Int. Cl. .................................................B01f 7/02
[58] Field of Search.......259/110, 109, 108, 9, 10, 99, 259/103, 25, 26, 45, 46, 68, 69, 104, 4–8, 16, 21–24, 32–34, 40–44, 64–67; 107/14 C, 14 H; 18/12 SM

[56] References Cited

UNITED STATES PATENTS 2,813,704  11/1957  MacKissic...............259/45 X
3,169,752   2/1965  DeLauberede...........259/9 X

FOREIGN PATENTS OR APPLICATIONS 560,204  9/1957  Belgium......................259/109

Primary Examiner—Jordan Franklin
Assistant Examiner—Geo. V. Larkin
Attorney—Craig, Antonelli and Hill

[57] ABSTRACT

A continuously operating, preferably single screw shaft, multiple-thread screw machine for the treatment, such as, for example, kneading, mixing and homogenizing, of plastic masses with a housing surrounding the screw shaft. The kneading, mixing and homogenizing treatment is carried out by the repeated and controlled separation and recombination of the stream of material. The separation and recombination is accomplished by a screw provided with cross webs in the individual screw channels and longitudinal webs on the outer periphery of the screw threads. The outer edges of the longitudinal webs are spaced from the inner wall of the housing at a greater distance than the clearance of the screw threads with respect to the inner wall of the housing. In addition, the longitudinal webs and cross webs have a flat rising slope of about between 15° to 30° in the direction of rotation of the screw.

44 Claims, 6 Drawing Figures

CONTINUOUSLY OPERATING SCREW MACHINE FOR THE TREATMENT OF PLASTIC MASSES

BACKGROUND OF THE INVENTION

The present invention relates to continuously operating, preferably single shaft, multiple-thread screw machines, and more particularly, to screw machines for the treatment, particularly kneading, mixing, and homogenizing, of plastic masses and being provided with a housing surrounding the screw shaft.

A conventional screw machine is known which has two auger shafts cooperating as a pair and the screw channels of which are provided with cross webs so that individual chambers are produced in the screw channels. Between these successive chambers, there remains a certain spatial communication in the longitudinal direction of these chambers due to these cross webs. This has the purpose of providing an especially high degree of uniformity of the product mixture. Although it is possible by means of such cross webs to cause, in each screw channel of the screw shaft, material of the stream of material to be transferred in layers into the subsequent chamber, the thus-combined portions move, in each case, side-by-side in a more or less loose arrangement without actually obtaining an intimate mixing also within smaller volume ranges.

As a result thereof, it can be seen that a really optimum mixing effect cannot be expected in these screw machines by the use of cross webs alone. This conclusion has also been confirmed in practice. Indeed, especially in the processing of viscid or viscous plastic masses (highly viscous masses), satisfactory results could not be achieved with known screw machines.

SUMMARY OF THE INVENTION

It is the aim of the present invention to overcome the problems and disadvantages in the previously known screw machines. A major objective is to provide a continuously operating screw machine which ensures that kneading, mixing and homogenizing of, in particular, plastic masses, and also within smaller volume ranges, can be carried out with especially good results. In contrast to the above-mentioned conventional twin-shaft screw machine, it is an object of the present invention to achieve a far higher quality of the treated material in a single shaft machine. Although the expenditure in machine parts is lower, the quantitative output obtained is not in any way reduced.

The underlying problems are solved in accordance with the present invention by utilizing the essential concept of conducting a mixing, kneading, and homogenizing of the material to be treated in accordance with the principle of a repeated, controlled separation and recombination of the stream of material by means of an appropriately shaped screw.

Accordingly, the present invention resides mainly in that, in machines of the above-mentioned type, there are provided, on the one hand, cross webs in the individual screw channels and, on the other hand, longitudinal webs on the outer periphery of the screw threads, the outer edges of which are disposed at a spacing from the inner wall of the housing. The spacing is larger than the running clearance of the screw windings or threads with respect to the inner wall of the housing. In this connection, a conventional multiple-thread screw is employed.

The cross web in a screw channel brings about an accumulation of the material to be treated with a highly effective shearing action, whereas the longitudinal web, in conjunction with this accumulation process, provides that a partial stream of the material to be treated can pass over into the adjacent screw channel.

Prior to each renewed separation of the stream of material, the previously combined partial streams are subjected together to an intense shearing and kneading treatment. Preferably, the arrangement can be such that, in each case, a cross web and a longitudinal web form an angle with a common vertex. In this connection, the aforementioned web arrangement represents a stream-dividing node.

At the cross web of such a stream-dividing or flow-separating node, the stream of material is accumulated, and the adjacent longitudinal web is disposed in the immediate area of this zone of accumulation, so that a partial stream of the material to be treated is forced to pass from the original screw channel into the adjacent screw channel at this longitudinal web of the stream-dividing node. Precisely by the repeated combination and subsequent division of the partial streams, an intimate intermixing is effected even in the smallest volume ranges.

The mixing, kneading, or homogenizing process is even more intensified by providing, in each screw channel, stream-dividing nodes consisting of a cross web and a longitudinal web. It was also found that the manner of distributing the cross webs in the individual adjacent screw channels with respect to the position of the stream-dividing nodes is of special importance. Consequently, the arrangement can also preferably be such that the stream-dividing nodes of adjacent screw channels are disposed offset with respect to one another in the conveying direction of the screw, and that the end of the cross web of one stream-dividing node is connected with the beginning of the longitudinal web of the stream-dividing node disposed, offset with respect to the former node in the conveying direction, in the adjacent screw channel by means of a continuous screw thread. In this connection, it is possible to arrange one or more additional cross webs in the area of this screw thread connecting the stream-dividing nodes.

It is further advisable to provide that one or more additional cross webs are arranged between two stream-dividing nodes, respectively, in the same screw channel.

It can readily be seen that the result of the mixing, kneading, or homogenizing process must be improved as more cross webs or longitudinal webs must be overcome by the material to be treated. Consequently, it is possible in accordance with the present invention to dispose additional cross webs preferably between respectively two stream-dividing nodes in the same screw channel.

In addition to the features of the invention set out above, the present invention is aimed at solving a further problem having very essential significance. Starting with the consideration that the individual mass particle in the stream of material can traverse varying paths within the screw machine due to successively executed stream divisions and recombinations, it is of particular value to provide that each mass particle, independently of the respectively traversed path within the screw machine, must always pass over the same number of longitudinal webs and cross webs. In this way, it is possible to achieve a treatment during the mixing, kneading, and homogenizing which is indeed entirely uniform even in case of any small volume proportion.

To solve this special problem, the accomplishment has been made in accordance with the present invention to develop a mathematical interrelationship wherein it is naturally also important, in order to be able to render a generally applicable teaching, how many threads the screw has in each case, and how the transition from the feed zone disposed in front of the shearing zone provided with stream-dividing nodes is designed. In this connection, in the following remarks, the number of threads of the screw is denoted by $n$, the succession of these threads with stream-dividing nodes is designated by $k1, k2, k3$, etc., and the number of cross webs being additionally employed is called $z$.

In order to facilitate the passage of the stream of material over the longitudinal webs or the cross webs, these webs can be formed, in all embodiments of the screw configuration, with a flat rising slope of between approximately 15° and 30° in the direction of rotation of the screw.

BRIEF DESCRIPTION OF THE DRAWING

These and further features, advantages and objects of the present invention will become more apparent from the following description when taken in conjunction with the accompanying drawing which shows, for purposes of illustration only, several embodiments in accordance with the present invention, and wherein.

DETAILED DESCRIPTION OF THE DRAWING

Figure 1:
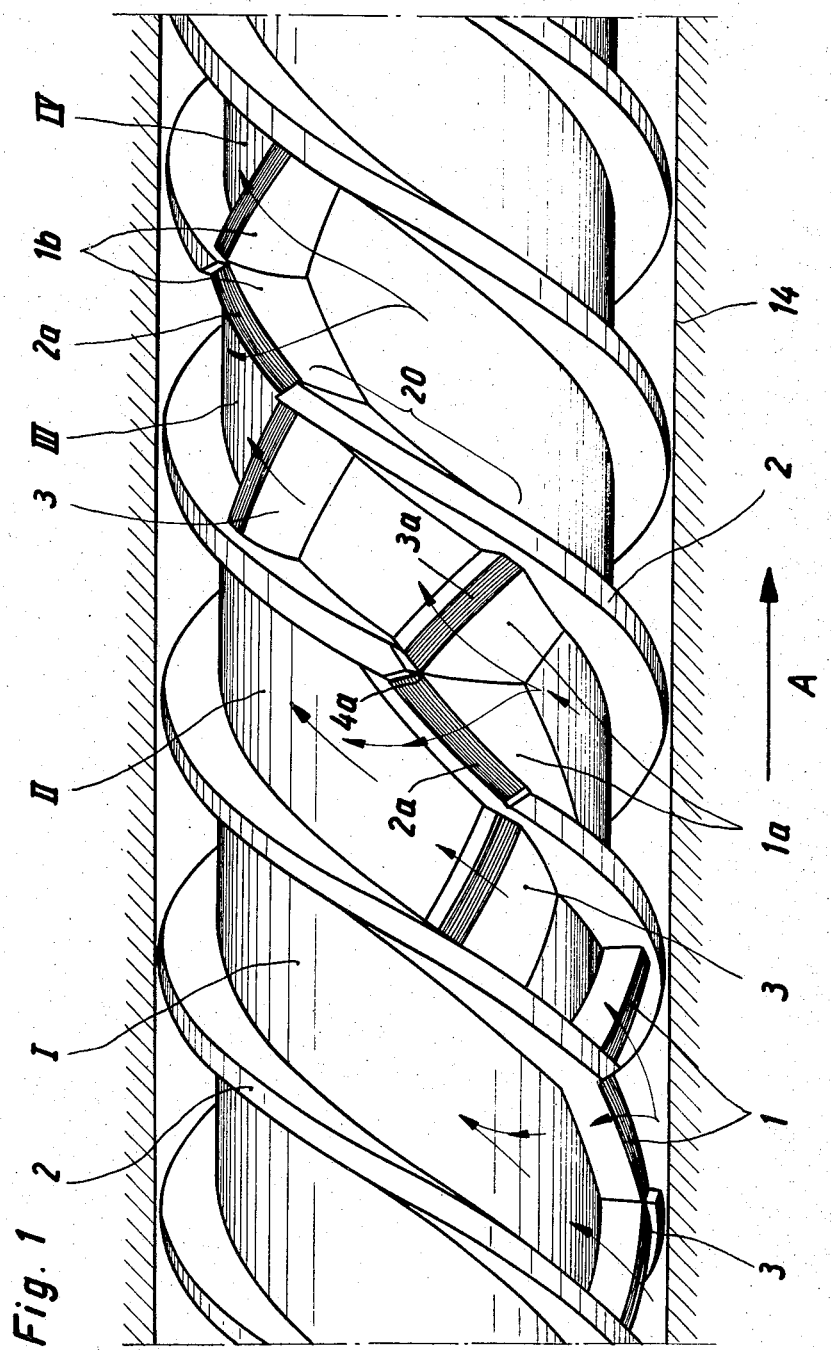
FIG. 1 is a partial view of a screw constructed in accordance with the present invention and showing the screw in a three-dimensional manner.

Referring now to the drawings and, in particular to FIG. 1, a single shaft screw of a screw machine having four screw channels I, II, III and IV is shown. These screw channels are separated by the threads of the screws denoted by the numeral 2. In the screw channels I through IV, cross webs 3 and 3a are provided.

Longitudinal webs are formed by sections of the screw thread having portions cut away so that the radially outermost edges thereof have a larger spacing from the housing than the outermost edges of the remaining sections of the threads. These longitudinal webs are designated by numeral 2a. The distance of the outer edge of the longitudinal webs 2a and the cross webs 3, 3a from the inner wall of the screw housing 14 is designated by numeral 13 and is larger than the running clearance which usually exists between the screw and the housing. The longitudinal webs 2a and the cross webs 3a are angularly joined and have a common vertex 4a. Such a web arrangement consisting of a longitudinal web 2a and an associated cross web 3a is called a stream-dividing node. In FIG. 1, three stream-dividing nodes 1, 1a, 1b can be seen.

Respectively, two cooperating stream-dividing nodes follow each other in the conveying direction, as shown by arrow A, of the screw in such a manner that there is disposed, between the end of the cross web 3a of the first stream-dividing node 1a and the beginning of the longitudinal web 2a of the second node 1b disposed in the adjacent channel, an uninterrupted web portion, which thus does not have a distributing or spreading effect. This uninterrupted portion is the screw thread portion 20. In this case, each web or web portion 2a, 3, 3a having a shearing, kneading, and distributing effect is followed, in the circumferential direction, by the screw thread 2 or 20 which does not have a distributing effect. As is customary, these screw threads have a conveying action.

In this embodiment with a quadruple-thread screw, an additional cross web 3 is provided between respectively two nodes following each other in a channel. Small arrows illustrated in the screw indicate how the repeated, controlled division and combination of the stream of material is, for example, executed.

Figure 2:
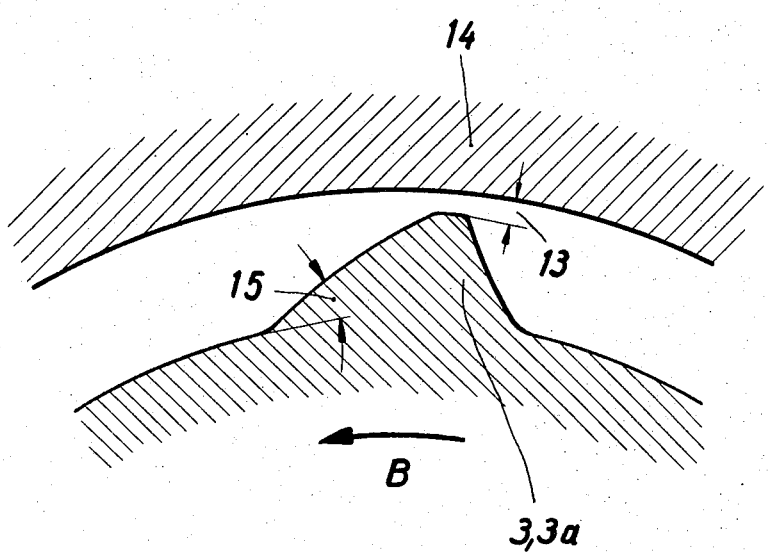
FIG. 2 shows one possibility of a design for the cross webs.

It can be seen from FIG. 2 how the cross webs 3, 3a are designed, for example, with respect to their orientation to the surrounding housing 14, for instance how the shearing gaps can be formed. The gap width 13 resulting in this case amounts, for example, to between 0.5 and several millimeters, depending on the material to be processed and other process conditions. In the direction of screw rotation, as shown by arrow B, the cross webs 3, 3a are designed with a flat ascending slope 15 of about 15° to 30°. This ascension is to be adapted to the frictional conditions of the processed mass. The longitudinal webs 2a can also be designed in a similar manner.

Figure 3:
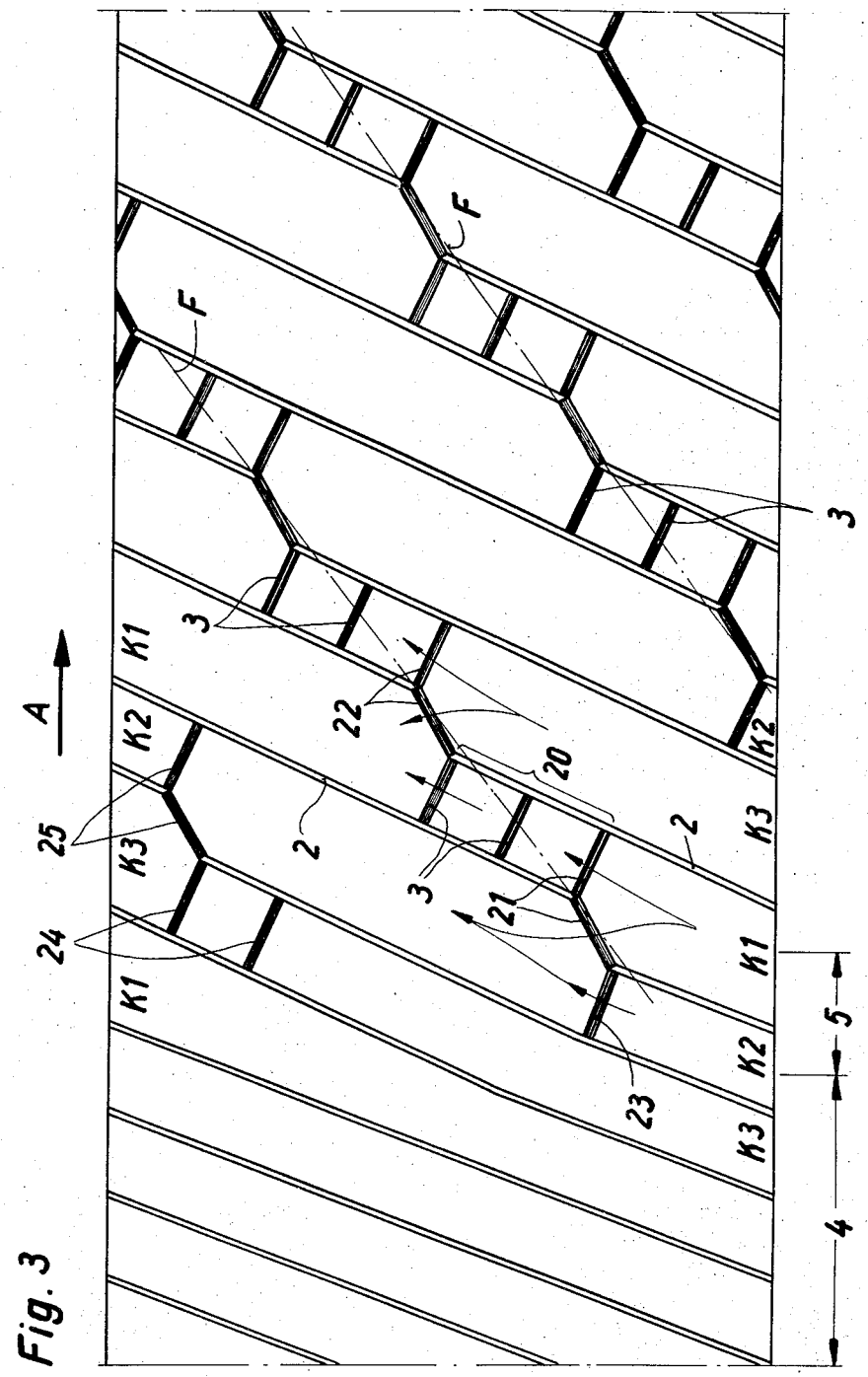
FIG. 3 is a partial view of a screw constructed according to the present invention with the surface thereof in the form of a developed projection.

In FIG. 3, as well as in the following figures, fragmentary sections of screws according to the present invention are illustrated, but the surface thereof is illustrated as a developed projection. FIG. 1 conveys an impression of how the developed projections shown in the following figures are to be pictured three-dimensionally.

Figure 4:
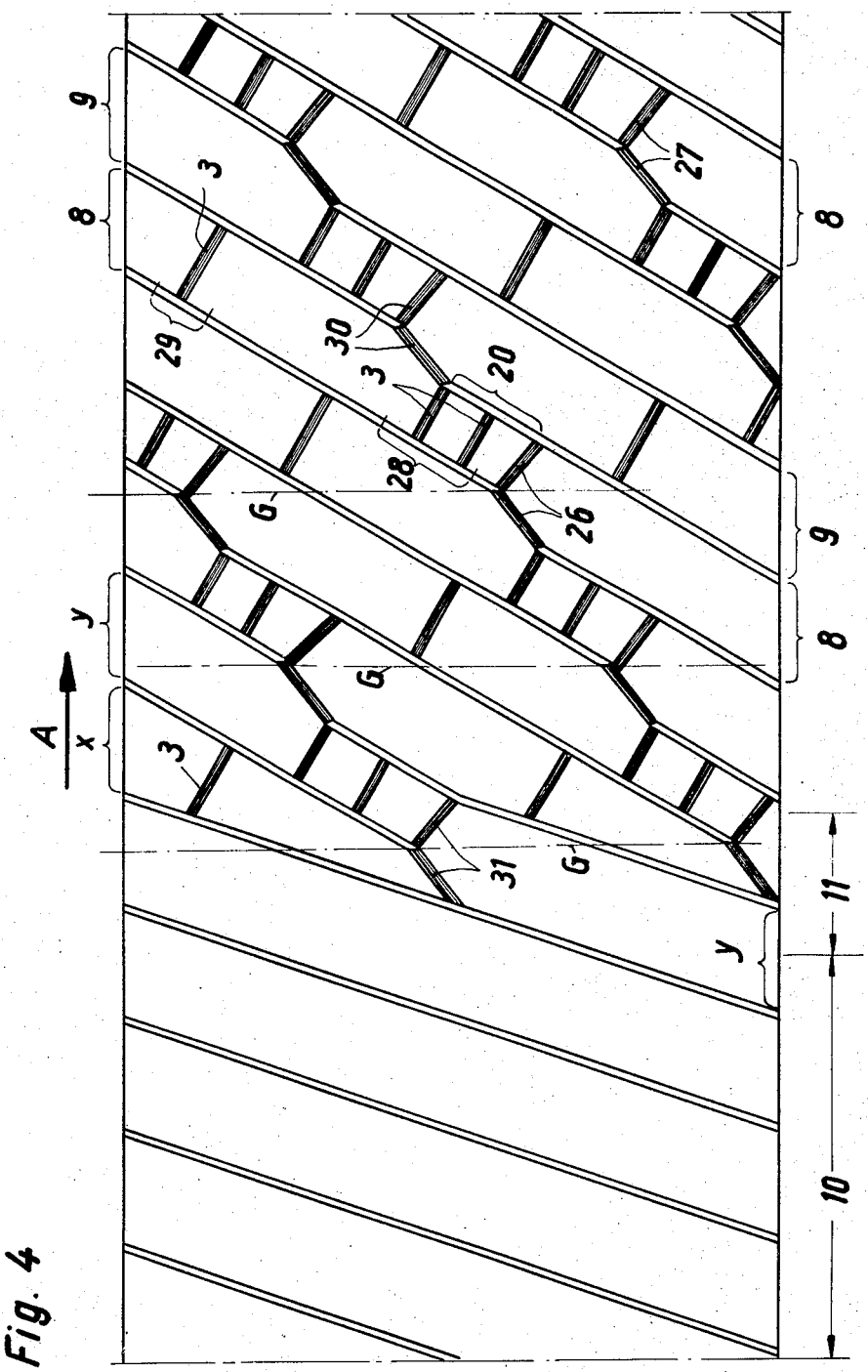
FIG. 4 is a fragmentary view of a developed projection of the screw surface having a design in accordance with a modification of the present invention.

In FIGS. 3 and 4, the feed and transition zones pertaining to the screw are disposed in front of the shearing zone proper and are likewise illustrated in a developed projection. The feed zone is denoted by 4 and the transition zone by 5 in FIG. 3. The feed zone 10 in FIG. 4 is provided with less threads than the subsequent zones, so that the machine can always be operated in the partially filled condition, independently of the metering.

The developed projection of FIG. 3 shows a screw with $n$ threads with respectively $n-1$ additional cross webs 3 between the successive stream-dividing nodes 21, 22 of adjacent channels. The screw thread section connecting the two cooperating nodes in each case has no distributing effect and is denoted by numeral 20, as in FIG. 1. Here, too, for the sake of clearer illustration, the smaller arrows are once again indicated for showing the flow directions of the material to be treated, in a manner analogous to FIG. 1. The screw illustrated in FIG. 3 is a three-thread screw, i.e. $n = 3$, and thus the number of the additional cross webs between the nodes 21, 22 is in each case $n-1$, i.e. $3 - 1 = 2$. The nodes of adjacent screw channels are connected in each case by screw thread sections 20 and are indicated in sequences F by dot-dash lines. The number of these successions is likewise $n-1$, i.e. $3 - 1 = 2$. In the transition zone 5, in front of the shearing zone, $k-1$ additional cross webs 23 and 24 can be seen in front of each first node of the $k^{th}$ thread (wherein $1 \leq k \leq n$). Therefore, this means the following. Designating the first channel wherein, as seen in the conveying direction A, the first node 21 is disposed, by $k_1$ and the additional channels by $k_2$ and $k_3$, then no additional cross web is provided in front of the first node 21 in the channel $k_1$, because at that point $k - 1$, i.e. $1 - 1$, equals zero. In channels $k_2$ and $k_3$, a number of additional cross webs 23 and 24 of $2 - 1 = 1$, and $3 - 1 = 2$ respectively, is obtained, which cross webs are disposed in front of the respectively first nodes 25 or 22 of the channels $k_2$ and $k_3$, respectively.

FIG. 4 illustrates another successful embodiment of the present invention. Here, the stream-dividing nodes are disposed in the form of several groups G of nodes arranged on a common periphery, indicated by dot-dash lines. The groups are axially offset with respect to one another in the conveying direction A of the screw. Between respectively two nodes 26, 27 following each other in a channel 8, two groups 28, 29 of additional cross webs 3 are arranged. These two groups 28, 29 of additional cross webs together contain the odd number of $z$ cross webs, in this case 3. One group 28 is disposed in front of the node 30 arranged in the next channel 9, as seen in the conveying direction of the screw; the other group 29 is disposed, as seen in the conveying direction of the screw, after the node 30. The first-mentioned group contains $$\frac{z+1}{2}, \text{ i.e. } \frac{3+1}{2} = 2$$

cross webs, and the last-mentioned group contains $$\frac{z-1}{2}, \text{ i.e. } \frac{3-1}{2} = 1$$

cross web. The node 30, in front of which the group 28 is arranged with $(z + 1/2)$ cross webs, is connected, from the point of its origin, with the end of the first node 26 of the two nodes 26, 27 following each other in the same channel 8, by means of a non-distributing, or continuous screw thread portion 20.

The transition zone 11 from the feed zone to the shearing zone is of a different configuration in the screw of FIG. 4 than in the previously described modification of the invention. For this screw has the even number of threads $n$ in its shearing zone, in this case 4. The feed zone 10 of the machine has the thread number $(n/2)$ (i.e., 2) for the above reasons. In the transition zone 11, each second channel of the shearing zone is fed with the material by way of the first node disposed, in the conveying direction, in the next channel rather than being fed directly. For example, the channel $x$ is fed by way of the first node 31 of the channel $y$. Furthermore after the first node in the above-mentioned second channel (in this case, after the node 31 in channel $x$), $(z - 1/2)$ additional cross webs 3, in this case 1, are arranged when the number of the cross webs disposed between two nodes following each other in the same channel is equal to $z$, in this case 3.

The lower limits of the residence time of a mass particle of the material to be treated are obtained in the present invention by considering that the mass particle under consideration always passes the right-hand shearing web half of each stream-dividing node and thus traverses the shortest path, whereas the upper limits are obtained by considering that the mass particle under consideration always passes the left-hand shearing web half of each stream-dividing node and thus traverses the longest path. Thereby, the width of the residence time spectrum is defined. In spite of the fact that the various mass particles are provided with the possibilities for remaining for different lengths of times, the present invention ensures that each mass particle is subjected to the same treatment in the screw machine by the fact that it must always pass over the same number of longitudinal webs and cross webs.

Figure 5:
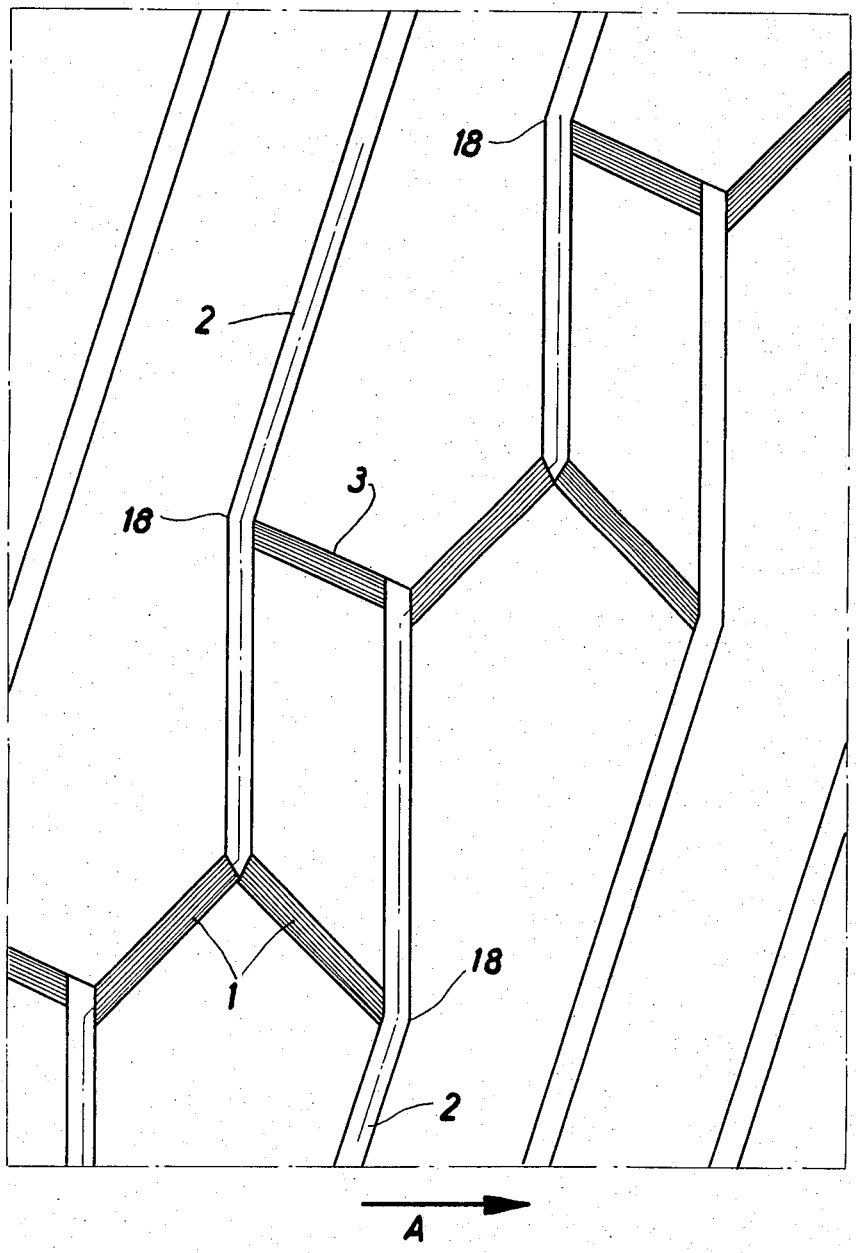
FIGS. 5 and 6 are developed projections of further modified variants.

In FIG. 5 as also in the following FIG. 6, it is shown that the construction of the present invention additionally anticipates a number of special cases. The two modifications illustrated in this connection are offered merely as examples.

FIG. 5 represents only a fragmentary view of a developed projection of a screw surface and shows that the screw threads 2 in the projection can also appear in a bent configuration, such a construction likewise being embraced by the concept of the present invention. In FIG. 5, the extension of the threads is indicated, in one case, with dot-dash lines. The bends are in each case denoted by numeral 18. Of course, this construction likewise has stream-dividing nodes 1 and additional cross webs 3 as described above. This special case of the construction of the present invention has been chosen in FIG. 5 in order to be able to accommodate more stream-dividing nodes along the same length of a thread. The more stream-dividing nodes which can be accommodated along the same screw length or shearing zone length of the screw, the larger becomes the width of the residence time spectrum.

Figure 6:
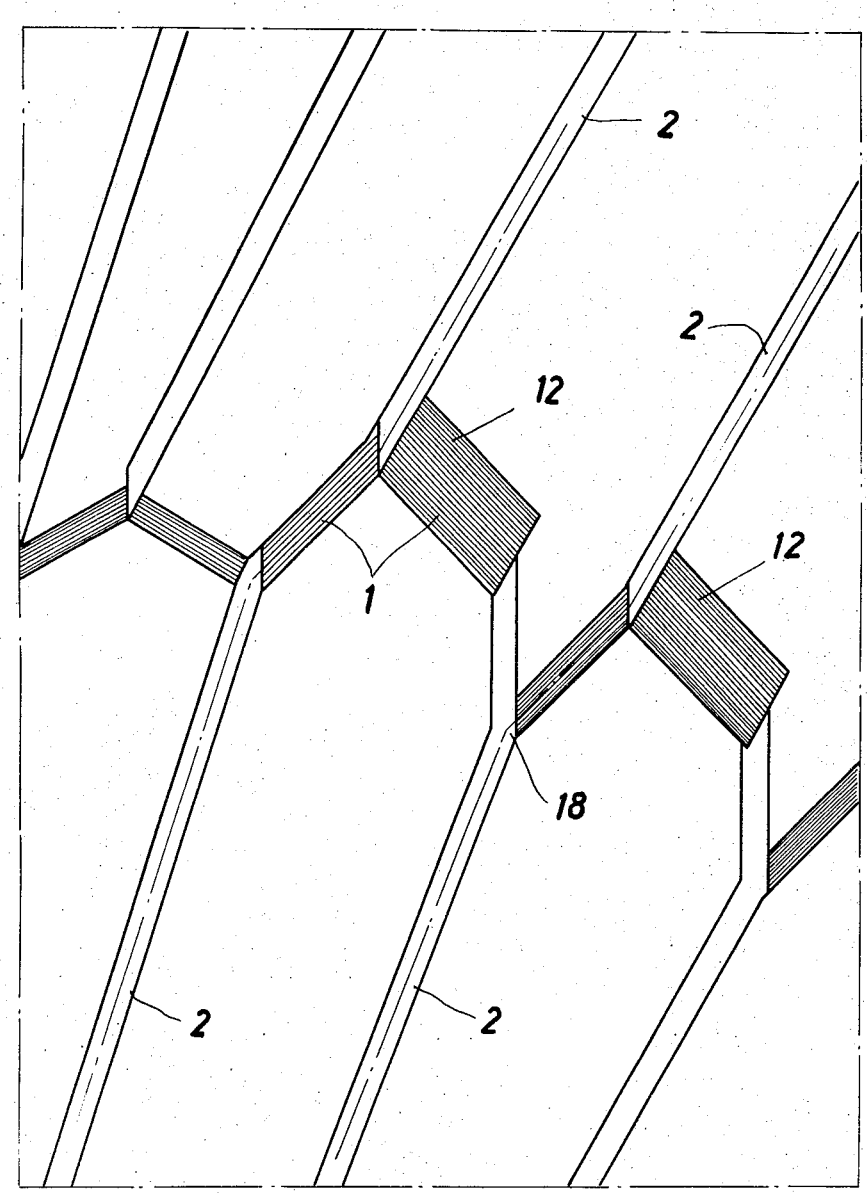

FIG. 6 represents an embodiment quite similar to the one described above. Here again, the course of the screw threads 2 is denoted by dot-dash lines, and the bend is denoted by numeral 18. In the special case of the construction of the present invention illustrated in FIG. 6, the cross webs of the stream-dividing nodes 1 are combined with the additional cross webs 3 or groups of these additional cross webs, as present in the previously described examples of the invention, thus obtaining the configurations 12. Such a construction permits the maximum number possible of stream-dividing nodes along an equally long screw length.

While we have shown and described several embodiments in accordance with the present invention, it should be clear that the same is susceptible of numerous changes and modifications as will be apparent to a person skilled in the art, and we, therefore, do not wish to be limited to the details shown and described herein but intend to cover all such changes and modifications as are encompassed by the scope of the present invention.

We claim:

1. Continuously operating screw machine for the treatment, such as kneading, mixing and homogenizing, of plastic masses, comprising: a housing; at least one screw shaft means operatively associated with and surrounded by said housing; said screw shaft means having multiple threads defining screw channels therebetween; cross webs located in said screw channels; and longitudinal webs located adjacent the outer periphery of said threads of said screw shaft means, said cross webs and said longitudinal webs having a larger clearance with respect to internal walls of said housing than the outer periphery of the threads of said screw shaft means, wherein each of said screw channels, respectively one of said cross webs and one of said longitudinal webs constitute a stream-dividing node.

2. Screw machine according to claim 1, wherein said longitudinal webs are formed by sections of respective screw threads having the outermost portions cut away so that the outermost edges of these sections have a larger spacing from the housing than the remaining portions of the threads.

3. Screw machine according to claim 1, wherein respectively one of said cross webs and one of said longitudinal webs form an angle therebetween and have a common vertex constituting the stream-dividing node.

4. Screw machine according to claim 1, wherein the outer edges of said longitudinal webs are spaced from the inner wall of said housing and the spacing therebetween being larger than the clearance of said threads with respect to the inner wall of said housing.

5. Screw machine according to claim 3, wherein the outer edges of said longitudinal webs are spaced from the inner wall of said housing and the spacing therebetween being larger than the clearance of said threads with respect to the inner wall of said housing.

6. Screw machine according to claim 2, wherein the stream-dividing nodes of adjacent screw channels are offset with respect to each other in the conveying direction of said screw shaft means.

7. Screw machine according to claim 6, wherein an end portion of a cross web of one stream-dividing node is operatively connected, by means of a continuous thread portion, to a beginning portion of a longitudinal web of the stream-dividing node offset with respect thereto in the conveying direction in the adjacent screw channel.

8. Screw machine according to claim 7, wherein each of said one respective cross web and longitudinal web constitutes the stream-dividing node by forming an angle therebetween with a common vertex.

9. Screw machine according to claim 7, wherein at least one cross web is located in the zone of said continuous thread portion connecting the offset stream-dividing nodes.

10. Screw machine according to claim 9, wherein each of said one respective cross web and longitudinal web constitutes the stream-dividing node by forming an angle therebetween with a common vertex.

11. Screw machine according to claim 6, wherein at least one cross web is located between two stream-dividing nodes in the same screw channel.

12. Screw machine according to claim 11, wherein an end portion of a cross web of one stream-dividing node is operatively connected, by means of a continuous thread portion, to a beginning portion of a longitudinal web of the stream-dividing node offset with respect thereto in the conveying direction in the adjacent screw channel.

13. Screw machine according to claim 12, wherein each of said one respective cross web and longitudinal web constitutes the stream-dividing node by forming an angle therebetween with a common vertex.

14. Screw machine according to claim 7, wherein $n$ number of threads are provided at said screw shaft means, and $n-1$ additional cross webs are provided in the zone of said continuous thread portion connecting two stream-dividing nodes offset in the conveying direction and related to adjacent screw channels.

15. Screw machine according to claim 14, wherein a feed zone and a transition zone are provided at said screw shaft means, the stream-dividing nodes connected by said continuous thread portion being arranged in $n-1$ sequences, and $k-1$ additional cross webs being provided at the transition between said feed and transition zones in front of each first stream-dividing node of a $k$th thread, wherein $1 \le k \le n$.

16. Screw machine according to claim 15, wherein at least one cross web is located between two stream-dividing nodes in the same screw channel.

17. Screw machine according to claim 7, wherein an even number $n$ of threads are provided and the stream-dividing nodes are arranged in parallel groups respectively arranged on a common cross-sectional plane.

18. Screw machine according to claim 17, wherein an odd number $z$ of additional cross webs are provided between two stream-dividing nodes located in the same screw channel, and wherein $(z + 1/2)$ of the additional cross webs are in the zone of said continuous thread portion and the remaining $(z - 1/2)$ additional cross webs are located after the stream-dividing node following said continuous thread portion, as seen in the conveying direction.

19. Screw machine according to claim 15, wherein each of said one respective cross web and longitudinal web constitutes by stream-dividing node by forming an angle therebetween with a common vertex.

20. Screw machine according to claim 19, wherein at least one cross web is located in the zone of said continuous thread portion connecting the offset stream-dividing nodes.

21. Screw machine according to claim 19, wherein at least one cross web is located between two stream-dividing nodes in the same screw channel.

22. Screw machine according to claim 17, wherein a shearing zone and a feeding zone located forwardly of said shearing zone are provided at said screw shaft means and $(n/2)$ threads are provided at said feeding zone, and wherein two threads of said shearing zone are associated with one thread of said feeding zone.

23. Screw machine according to claim 22, wherein $(z - 1/2)$ additional cross webs are provided in the channel of the stream-dividing nodes of a second of said parallel groups of the nodes located in a cross-sectional plane axially between the first and the second of said parallel groups.

24. Screw machine according to claim 23, wherein each of said one respective cross web and longitudinal web constitutes the stream-dividing node by forming an angle therebetween with a common vertex.

25. Screw machine according to claim 24, wherein an odd number z of additional cross webs are provided between two stream-dividing nodes located in the same screw channel, and wherein $(z + 1/2)$ of the additional cross webs are in the zone of said continuous thread portion and the remaining $(z - 1/2)$ additional cross webs are located after the stream-dividing node following said continuous thread portion, as seen in the conveying direction.

26. Screw machine according to claim 25, wherein at least one cross web is located in the zone of said continuous thread portion connecting the offset stream-dividing nodes.

27. Screw machine according to claim 25, wherein at least one cross web is located between two stream-dividing nodes in the same screw channel.

28. Screw machine according to claim 1, wherein said threads have bent portions at the stream-dividing nodes.

29. Screw machine according to claim 28, wherein the outer edges of said longitudinal webs are spaced from the inner wall of said housing and the spacing therebetween being larger than the clearance of said threads with respect to the inner wall of said housing.

30. Screw machine according to claim 29, wherein each of said one respective cross web and longitudinal web constitutes the stream-dividing node by forming an angle therebetween with a common vertex.

31. Screw machine according to claim 30, wherein the stream-dividing nodes of adjacent screw channels are offset with respect to each other in the conveying direction of said screw shaft means.

32. Screw machine according to claim 31, wherein an end portion of a cross web of one stream-dividing node is operatively connected, by means of a continuous thread portion, to a beginning portion of a longitudinal web of the stream-dividing node offset with respect thereto in the conveying direction in the adjacent screw channel.

33. Screw machine according to claim 32, wherein at least one cross web is located in the zone of said continuous thread portion connecting the offset stream-dividing nodes.

34. Screw machine according to claim 31, wherein at least one cross web is located between two stream-dividing nodes in the same screw channel.

35. Screw machine according to claim 31, wherein an even number $n$ of threads is provided and the stream-dividing nodes are arranged in parallel groups respectively arranged on a common cross-sectional plane.

36. Screw machine according to claim 1, wherein said longitudinal webs and said cross webs are provided with a substantially flat ascending slope of between about 15° to 30°.

37. Screw machine according to claim 36, wherein the outer edges of said longitudinal webs are spaced from the inner wall of said housing and the spacing therebetween being larger than the clearance of said threads with respect to the inner wall of said housing.

38. Screw machine according to claim 37, wherein respectively one of said cross webs and one of said longitudinal webs form an angle therebetween and have a common vertex thereby constituting the stream-dividing node.

39. Screw machine according to claim 38, wherein the stream-dividing nodes of adjacent screw channels are offset with respect to each other in the conveying direction of said screw shaft means.

40. Screw machine according to claim 39, wherein an end portion of a cross web of one stream-dividing node is operatively connected, by means of a continuous thread portion, to a beginning portion of a longitudinal web of the stream-dividing node offset with respect thereto in the conveying direction in the adjacent screw channel.

41. Screw machine according to claim 40, wherein at least one cross web is located in the zone of said continuous thread portion connecting the offset stream-dividing nodes.

42. Screw machine according to claim 38, wherein at least one cross web is located between two stream-dividing nodes in the same screw channel.

43. Screw machine according to claim 39, wherein $n$ number of threads are provided at said screw shaft means, and $n-1$ additional cross webs are provided in the zone of said continuous thread portion connecting two stream-dividing nodes offset in the conveying direction and related to adjacent screw channels.

44. Screw machine according to claim 37, wherein said threads have bent portions at the stream-dividing nodes.

* * * * *